H. P. SIMMONS & A. J. KING.
Bee-Hives.
No. 135,493. Patented Feb. 4, 1873.
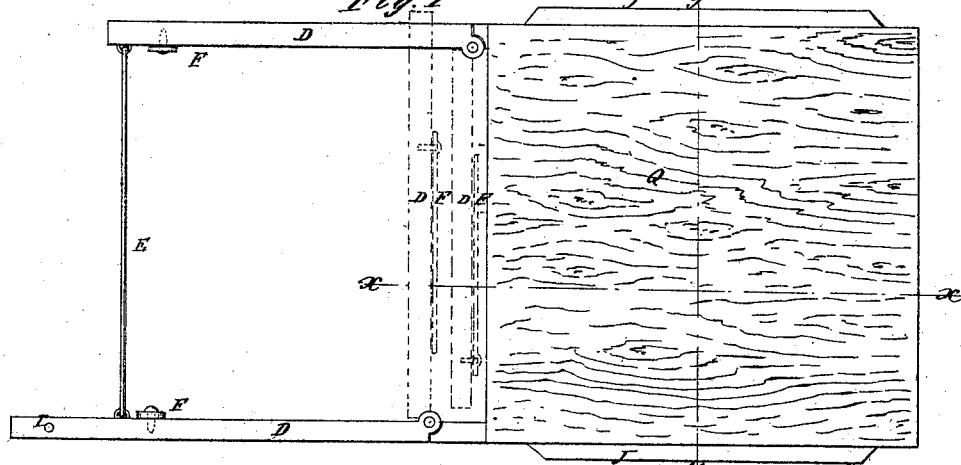
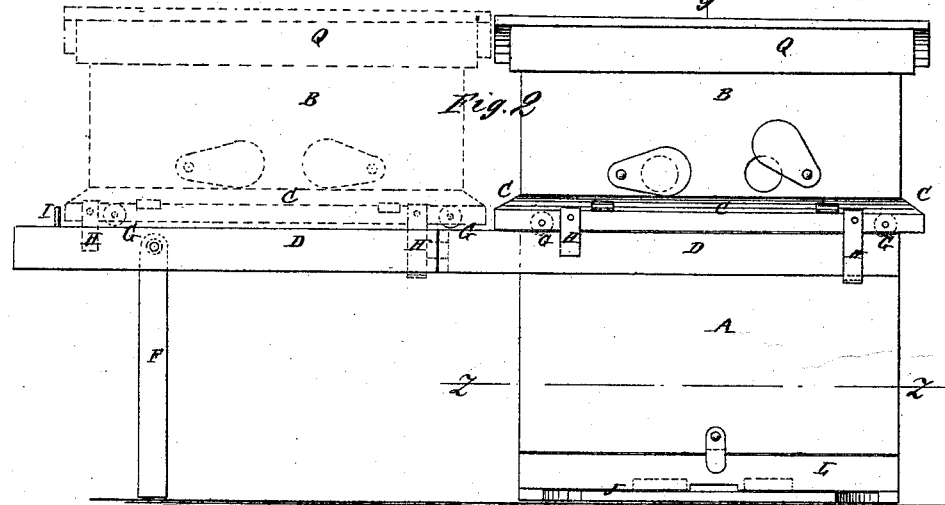
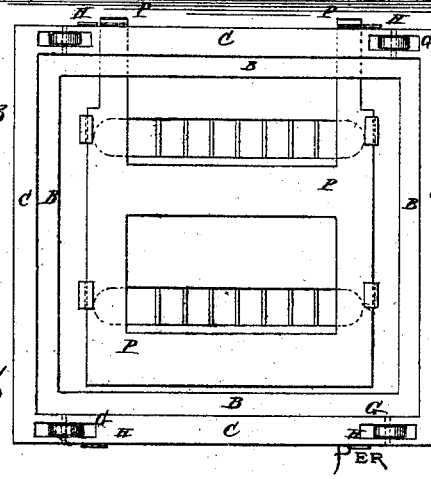

H. P. SIMMONS & A. J. KING.
Bee-Hives.

No. 135,493.

2 Sheets--Sheet 2.

Patented Feb. 4, 1873.

Witnesses:
A. W. Almqvist
C. Sedgwick

Inventor:
H. P. Simmons
A. J. King
per
Attorneys.

AM. PHOTO-LITHOGRAPHIC CO. N.Y. (OSBORNE'S PROCESS.)

UNITED STATES PATENT OFFICE.

H. PETER SIMMONS, OF PATERSON, AND ALBERT J. KING, OF HUDSON, NEW JERSEY.

IMPROVEMENT IN BEE-HIVES.

Specification forming part of Letters Patent No. 135,493, dated February 4, 1873.

*To all whom it may concern:*

Figure 4:
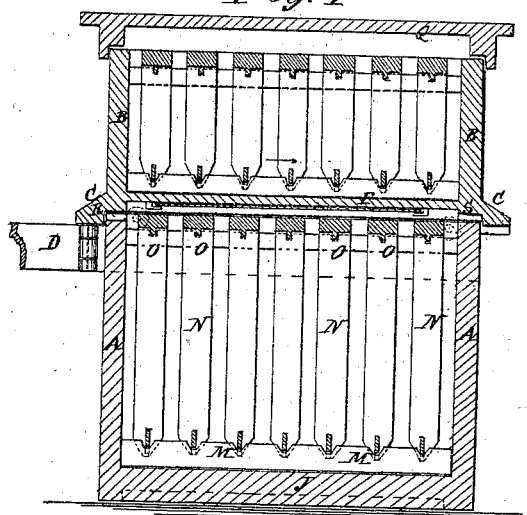
Figure 5:
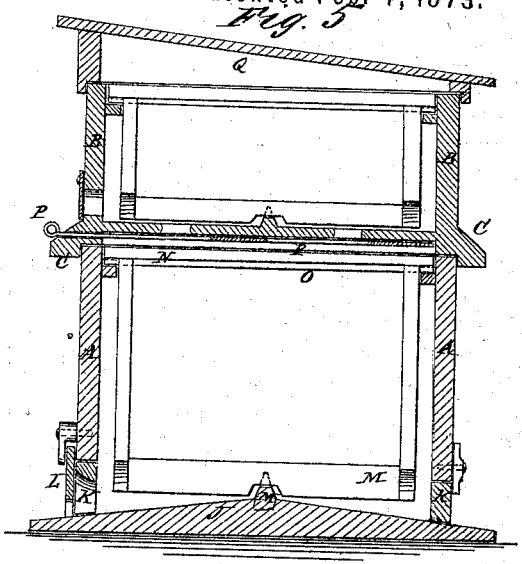
Figure 6:
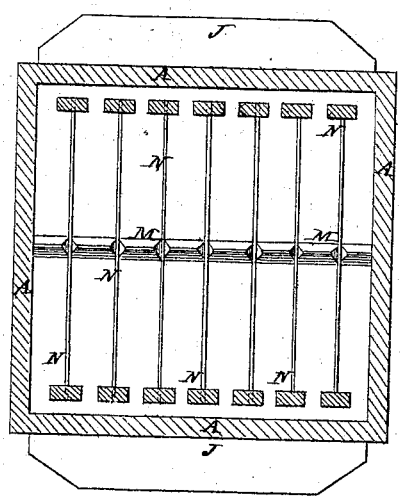

Be it known that we, H. PETER SIMMONS, of Paterson, in the county of Passaic and State of New Jersey, and ALBERT J. KING, of Hudson City, in the county of Hudson and State of New Jersey, have invented a new and useful Improvement in Bee-Hive, of which the following is a specification:

Figure 1, Sheet I, is a top view of our improved bee-hive, showing the slides extended. Fig. 2, Sheet I, is a front view of the same, showing in dotted lines the position of the upper part of the hive when pushed upon the slides. Fig. 3, Sheet I, is an under-side view of the upper part of the hive. Fig. 4, Sheet II, is a detail vertical cross-section of the hive taken through the line $x\,x$, Fig. 1. Fig. 5, Sheet II, is a detail vertical longitudinal section of the hive taken through the line $y\,y$, Fig. 1. Fig. 6, Sheet II, is a detail horizontal section of the lower part of the hive taken through the line $z\,z$, Fig. 2.

Similar letters of reference indicate corresponding parts.

Our invention has for its object to improve the construction of bee-hives, so as to make them better adapted for the various operations necessary in taking care of bees, and more convenient in use than hives constructed in the ordinary manner; and it consists in the construction hereinafter described, whereby the top portion of the hive may be moved off the body portion on supporting-bars, lower parts of the comb-frames secured from lateral movement, and other advantageous results are attained.

A is the lower and B is the upper part of the body of the hive. The lower edges of the sides of the upper part B rest upon the upper edges of the lower part A, and the four sides of the said upper part are provided with cleats or ledges C, which overlap the said lower part upon the front, rear, and one side, and slightly upon the other side, the upper sides of said cleats or ledges C being inclined to allow the water to run off freely. The upper edge of the side of the lower part A, between the projecting ends of the slides D, is cut off or shortened to form a recess, R, so as not to crush the bees that may be upon said edge when the upper part B is slid into place above the lower part; and, for the same reason, the lower edge of the side of the upper part B is cut off or shortened to form a recess, S, upon the side of the hive opposite to the cut-away edge of the lower part, as shown in Fig. 4. To the front and rear sides of the lower part A are attached bars D, upon which the front and rear ledges C rest, and which extend out at one side of the hive a little further than the breadth of the said hive, as shown in Figs. 1 and 2. The bars or slides D are hinged, one close to the side of the lower part A of the hive, and the other at a litttle distance from said side, so that when not in use they may be folded up against the side of the hive, as shown in dotted lines in Fig. 1. The outer ends of the slides D, when extended, are connected and held in their proper relative position by a rod, E, upon the ends of which are formed hooks to hook into eyes or staples attached to said slides.

The slides D are supported, when extended, by drop-legs F pivoted to them, and which may be turned up parallel with said slides when folded, as shown in dotted lines in Fig. 1. The front and rear ledges C, that slide along the slides D, are provided with friction-rollers G to enable the part B to be moved easily upon the said slides D, and which, when the part B is directly over the part A, drop into recesses in the stationary parts of the slides D to keep the said part B in place, as shown in Fig. 2. When the top B is to be moved off the body of the hive the rollers G cause it to rise in a diagonal or oblique direction, thus overcoming the adhesion due to the glue applied by the bees to the adjacent edges of the parts. The front and rear ledges C are provided with guards H to keep the part B in place upon the slides D while being moved back and forth, and the slides D, one or both, are provided with a stop, I, to keep the part B from sliding off the ends of said slides. J is the bottom of the hive, the upper side of which inclines downward from the center toward the front and rear, and its front and rear edges project to form platforms for the bees to alight upon, as shown in Figs. 1, 2, 5, and 6. The lower edges of the front and rear sides of the part A are cut away, and the spaces thus formed are closed with strips K, one or both of which strips have one, two, or more notches formed in them to serve as passages for the bees. When the strips K have notches formed in them they are provided with strips L having a single notch formed in its lower edge, as shown in Figs. 2 and 5, which strips L are secured in place by buttons.

By this construction, by adjusting the strips K L, any desired amount of passage-way may be given to the bees, and the bees may be admitted at front or rear, either or both. The strips K L also enable robber-bees to be shut out, and any desired amount of ventilation to be given to the hive.

Along the ridge or central part of bottom J is secured a cleat, M, the upper edge of which is notched to receive the bottom bars of the comb-frames N to keep them in proper relative position, and prevent any lateral movement. The lower edges of the bottom bars of the comb-frames N are also notched to receive the strip M, and prevent any longitudinal movement of said comb-frames N. The notches in the bar N and strip M are cut beveled or inclined on the sides or edges to facilitate fitting them easily and quickly together—an operation often of some difficulty. This construction also reduces the surface to which the bees may apply glue or propolis. The ends of the top bars of the comb-frames N project beyond the side bars of said frames to rest upon cleats or ledges attached to or formed upon the upper part of the inner sides of the part A of the hive. The under side of the top bar of the comb-frames N is grooved longitudinally to receive the comb-guides O, which project as tongues, and the ends of which project beyond the side bars of said comb-frames to enter notches or saw-kerfs in the ledges or cleats upon which said frames are hung to prevent any movement of the upper parts of said comb-frames. The bottom of the upper part B of the hive has slots formed in it to allow the bees to pass freely from one to the other of the parts A B. P is a plate which slides in guides attached to the lower side of the bottom of the upper part B of the hive. The plate P is slotted, and is made with arms which pass out through holes in the sides of the part B, so that it may be readily operated without opening the hive to open or close the said slots or passage-ways.

The upper part B of the hive may be provided with honey-boxes, or with comb-frames constructed and arranged in the same manner as the comb-frames N O, as may be desired.

The upper part B may also have openings in its side or sides to allow the bees to pass directly out of and into said part when desired, which openings should be provided with covers, so that they may be opened and closed as desired.

Q is the cover, the lower edges of which are rabbeted to fit upon the upper edges of the upper part B. The cover Q is made inclined, as shown in Fig. 5, so that the water may run off freely.

Having thus described our invention, we claim as new and desire to secure by Letters Patent—

1. The combination of the rollers G with the top B of the hive and the bars D provided with recesses for the same, for the purpose of locking the top in its normal position, and raising it off the base when it is to be moved laterally, as shown and described.

2. The strip M secured to the central elevated portion of the bottom board J, in combination with the bottom bars N of the comb-frames, said strip and bottom bars being provided with beveled notches, as and for the purpose specified.

3. The recesses R and S formed by cutting away the top of one side of the part A and the other by cutting away the lower edge of the top B on the opposite side, whereby said top may be moved over the comb-frames, and allowed to drop into place without injuring the bees, as set forth.

H. PETER SIMMONS.
ALBERT J. KING.

Witnesses:
H. C. HUDSON,
HARRY C. HUDSON.